US009252906B2

(12) United States Patent
Abe et al.

(10) Patent No.: US 9,252,906 B2
(45) Date of Patent: Feb. 2, 2016

(54) COMMUNICATION SYSTEM, TRANSMITTER APPARATUS AND RECEIVER APPARATUS

(71) Applicant: NIPPON TELEGRAPH AND TELEPHONE CORPORATION, Tokyo (JP)

(72) Inventors: Junichi Abe, Yokosuka (JP); Kiyoshi Kobayashi, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 120 days.

(21) Appl. No.: 14/236,557

(22) PCT Filed: Sep. 25, 2012

(86) PCT No.: PCT/JP2012/006076
§ 371 (c)(1),
(2) Date: Jan. 31, 2014

(87) PCT Pub. No.: WO2013/046636
PCT Pub. Date: Apr. 4, 2013

(65) Prior Publication Data
US 2014/0211814 A1      Jul. 31, 2014

(30) Foreign Application Priority Data
Sep. 26, 2011   (JP) ................. 2011-209014

(51) Int. Cl.
*H04J 4/00*     (2006.01)
*H04L 27/26*    (2006.01)
*H04B 1/69*     (2011.01)

(52) U.S. Cl.
CPC ... *H04J 4/00* (2013.01); *H04B 1/69* (2013.01); *H04L 27/2626* (2013.01); *H04L 27/2636* (2013.01); *H04L 27/2647* (2013.01)

(58) Field of Classification Search
None
See application file for complete search history.

(56) References Cited

U.S. PATENT DOCUMENTS

2003/0058975 A1* 3/2003 Baas ............ H03H 17/02
                                                    375/350
2005/0099939 A1* 5/2005 Huh ............ H04L 27/2626
                                                    370/210

(Continued)

FOREIGN PATENT DOCUMENTS

JP    2007-312200 A    11/2007
WO    WO-2008/007506 A1    1/2008

OTHER PUBLICATIONS

Abe et al.; "Bandwidth Decomposition Employing Spectrum Editing Technique for High Frequency Utilization Efficiency"; The Institute of Electronics Information and Communication Engineers Technical Report; SAT2009-48; published by The Institute of Electronic, Information and Communication Engineers; pp. 7-12 with English abstract, Dec. 2009.

(Continued)

*Primary Examiner* — Jutai Kao
(74) *Attorney, Agent, or Firm* — Harness, Dickey & Pierce, P.L.C.

(57) ABSTRACT

A transmitter of a communication system includes a spectrum dividing section which divides a transmission signal into a plurality of sub-spectra at a first sampling speed F1 and combines one or more low-speed intermediate composite signals from the divided sub-spectra, and a multiplexing section which multiplexes the intermediate composite signals at a second sampling speed F2 faster than the first sampling speed F1 (F2>F1) and distributes to a broadband. A receiver includes a demultiplexing section which extracts one or more low-speed intermediate composite signals from a reception signal at the second sampling speed F2, and a spectrum combining section which combines the intermediate composite signals at the first sampling speed F1 and extracts the sub-spectra to re-combines the transmission signal.

3 Claims, 8 Drawing Sheets

(56) References Cited

U.S. PATENT DOCUMENTS

2009/0304031 A1 12/2009 Kobayashi et al.
2013/0272461 A1* 10/2013 Lomayev .............. H04L 27/265
375/340

OTHER PUBLICATIONS

Kazuhiro Tanabe, Kiyoshi Kobayashi, Hiroshi Kazama, "Seamless Multirate Filter Bank", IEICE Technical Report. A-P, Antenna-Denpa, vol. 99, No. 44, May 14, 1999, pp. 9 to 14, with English abstract.

Jun-ichi Abe, Fumihiro Yamashita, Kiyoshi Kobayashi, Direct spectrum division transmission for highly efficient satellite communications, Advanced satellite multimedia systems conference (asma) and the 11th signal processing for space communications workshop (spsc), 2010 5th, Sep. 15, 2010, pp. 401-406.

International Search Report (3 pages) and Written Opinion of the ISA (4 pages), ISA/JP, mailed Oct. 30, 2012.

International Preliminary Report on Patentability with annexes issued Sep. 9, 2013, (12 pages) and translation of annexes (6 pages).

* cited by examiner

FIG. 2
(a) input of spectrum dividing filter
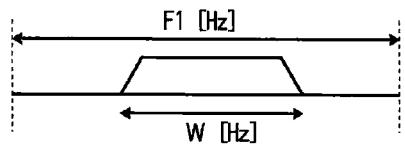
(b) output of spectrum dividing filter
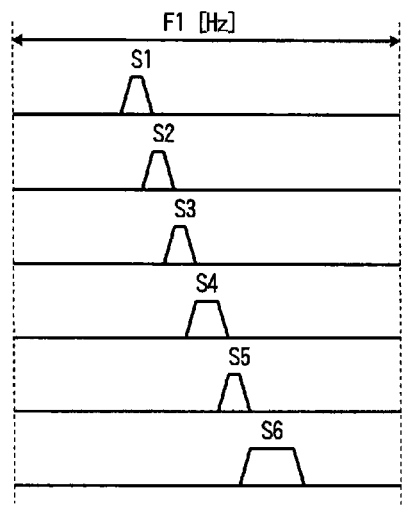
(c) output of Tx frequency shifter
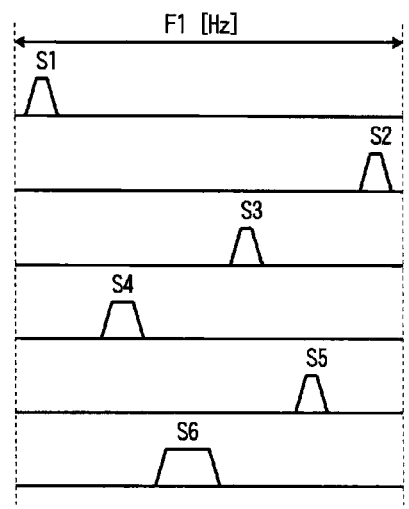
(d) output of Tx spectrum combining circuit (intermediate composite signal)
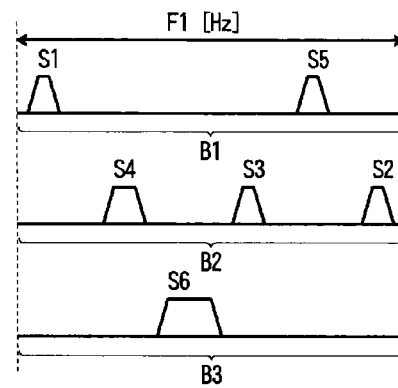
(e) output of multiplexer
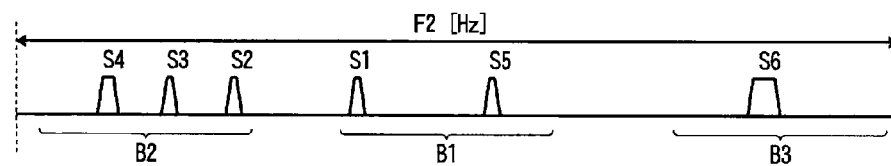

FIG. 3
(a) input of demultiplexer
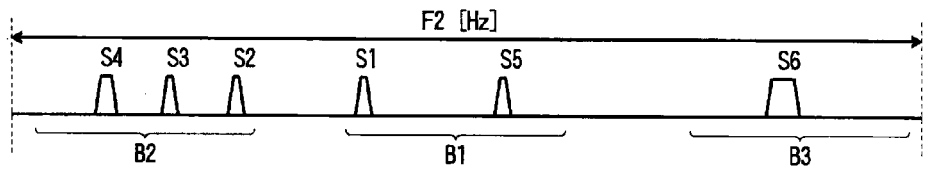
(b) output of demultiplexer
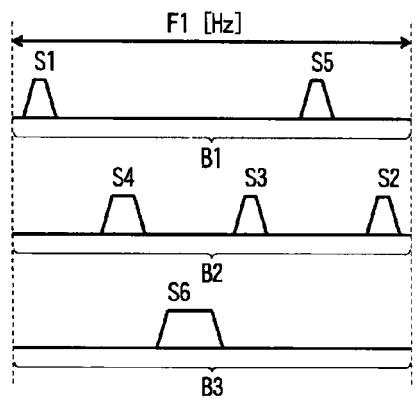
(c) output of spectrum extracting filter
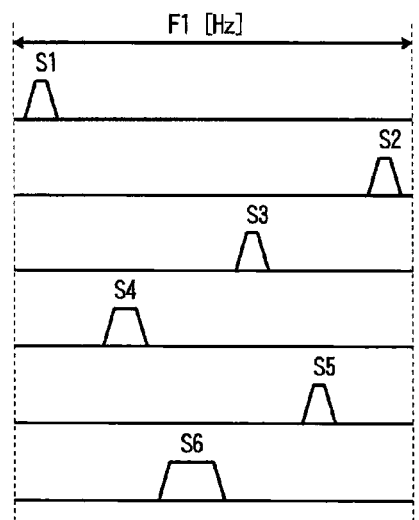
(d) output of Rx frequency shifter
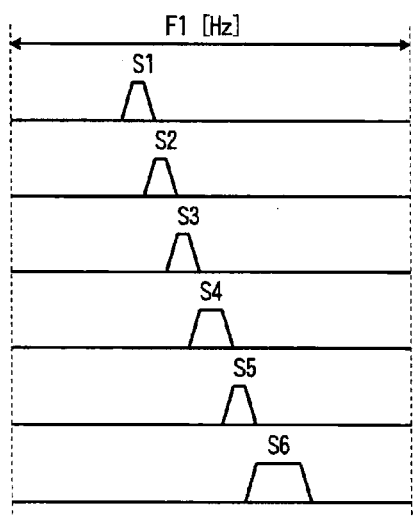
(e) output of Rx spectrum combining circuit
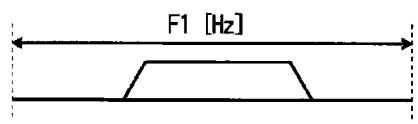

PRIOR ART
FIG. 7
(a) input of spectrum dividing filter
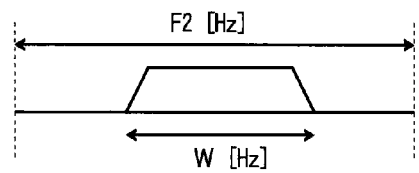
(b) output of spectrum dividing filter
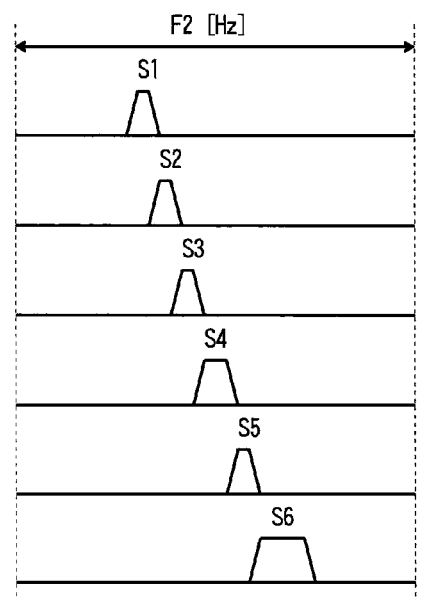
(c) output of Tx frequency shifter
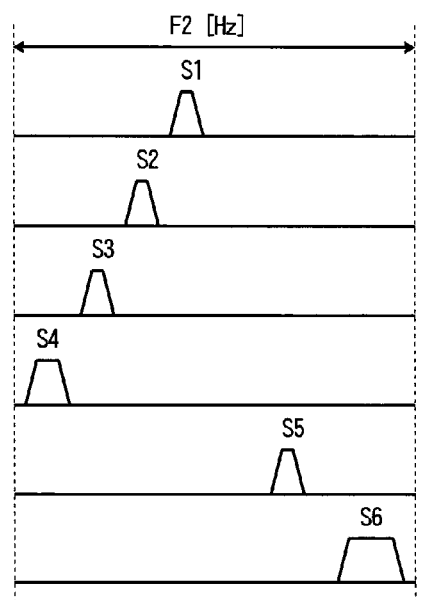
(d) output of Tx spectrum combining circuit
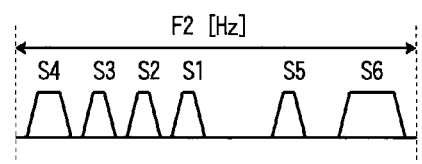

PRIOR ART
FIG. 8
(a) input of spectrum extracting filter
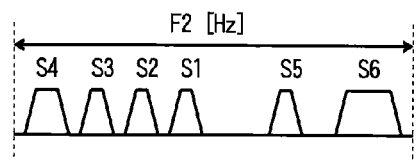
(b) output of spectrum extracting filter
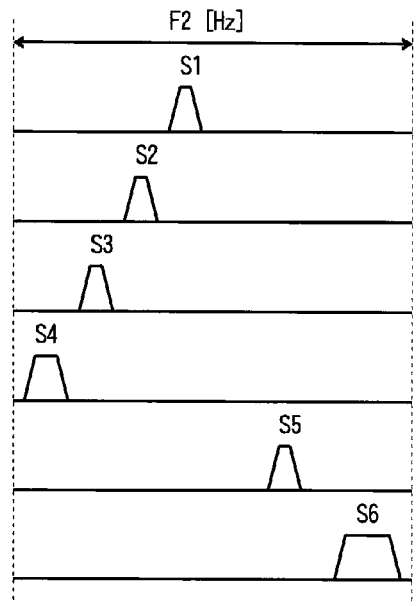
(c) output of Rx frequency shifter
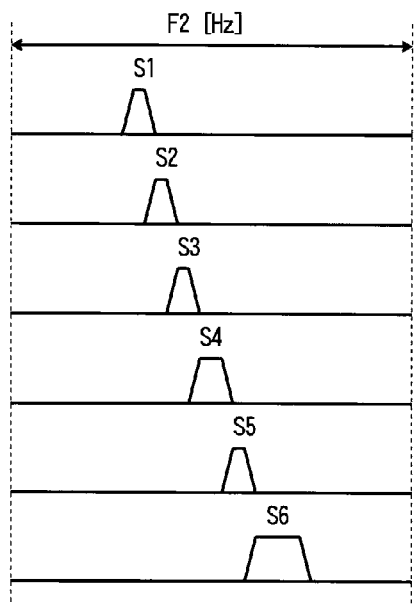
(d) output of Rx spectrum combining circuit
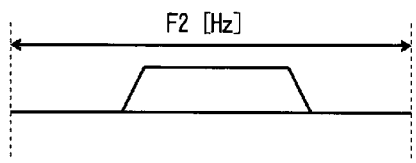

COMMUNICATION SYSTEM, TRANSMITTER APPARATUS AND RECEIVER APPARATUS

CROSS REFERENCE TO RELATED APPLICATIONS

This application is a U.S. National Stage application claiming the benefit of prior filed International Application Number PCT/JP2012/006076, filed on Sep. 25, 2012, in which the International Application claims priority from Japanese Patent Application Number 2011-209014, filed on Sep. 26, 2011, the entire contents of which are incorporated herein by reference.

TECHNICAL FIELD

The present invention relates to a communication system, a transmitter (Tx) and a receiver (Rx) that divide a modulated signal into plural spectra to be transmitted.

BACKGROUND ART

As a technique that divides a single carrier modulated signal into plural spectra and effectively uses discontinuous frequency bands, a direct spectrum division transmission method disclosed in Non-Patent Document 1 is known. The direct spectrum division transmission employs signal processing in a frequency domain, in which a transmission side directly divides a frequency spectrum of a modulated signal and distributes the divided frequency spectra, and a reception side extracts the divided frequency spectra (sub-spectra) and re-combines the extracted frequency spectra.

FIG. 6 illustrates a configuration example of a communication system in the related art that performs the direct spectrum division transmission. FIG. 6(a) shows a configuration of a transmitter in the communication system, and signal waveforms of respective sections of the transmitter are shown in FIG. 7. FIG. 6(b) shows a configuration of a receiver in the communication system, and signal waveforms of respective sections of the receiver are shown in FIG. 8.

In the transmitter of FIG. 6(a), a transmission signal is input to a time window processing section 61, is extracted in a time window of a P-point length for processing a continuous signal in a frequency domain, is converted to the frequency domain by a fast Fourier transform section (FFT) of a P-point length (P-point FFT) 62, and is input to a spectrum dividing filter 63 (FIG. 7(a)). Then, the signal is divided into plural sub-spectra by the spectrum dividing filter 63 (S1 to S6 in FIG. 7(b)). The respectively divided sub-spectra are frequency-converted to predetermined frequencies by a Tx frequency shifter 64 (FIG. 7(c)), and are combined to one signal by a Tx spectrum combining circuit 65 (FIG. 7(d)). Then, the signal is re-converted to a time domain by an inverse fast Fourier transform section (IFFT) of a P-point length (P-point IFFT) 66, and is re-assembled as a continuous signal through an overlap and add circuit 67.

In the receiver of FIG. 6(b), a reception signal is input to a time window processing section 71, is extracted in a time window of a P-point length, is converted to a frequency domain by a P-point FFT 72 of a P-point length, and is input to a spectrum extracting filter 73 (FIG. 8(a)). Then, individual sub-spectra are extracted by the spectrum extracting filter 73 (FIG. 8(b)). The respectively extracted sub-spectra are frequency-converted to have the same frequency relation as the frequency relation immediately after the spectrum dividing filter of the transmitter by a Rx frequency shifter 74 (FIG. 8(c)), and are re-combined to one signal by a Rx spectrum combining circuit 75 (FIG. 8(d)). Then, the signal is re-converted to a time domain by a P-point IFFT 76 of a P-point length, and is re-assembled as a continuous signal through an overlap and add circuit 77.

For simplicity, in FIG. 6, another branch configuration having the same configuration, necessary for an overlap and add process is not shown.

Non-Patent Document 1: ABE, YAMASHITA, and KOBAYASHI; "Bandwidth Decomposition Employing Spectrum Editing Technique for High Frequency Utilization Efficiency"; The Institute of Electronics, Information and Communication Engineers Technical Report; SAT2009-48; December, 2009.

DISCLOSURE

Problems to be Solved

In the direct spectrum division transmission in the related art, when the divided spectra are distributed, if a bandwidth F2 of the distributed spectra is extremely wider than a bandwidth W of a signal spectrum, a circuit size becomes large. For example, if design is made with reference to the bandwidth W of the signal spectrum, it is necessary to perform processing over the bandwidth F2 having wide frequency resolution for division of the bandwidth W, which enlarges the circuit size. On the other hand, if the resolution is increased with reference to the bandwidth F2 after distribution, it is difficult to divide the signal spectrum of the bandwidth W.

For simplicity, it is assumed that the sub-spectra can be arranged anywhere in the bandwidth F2 (actually, a bandwidth where the sub-spectra can be arranged is narrower than F2 in order to prevent aliasing due to a sampling theorem), and a condition of W=2 kHz and F2>50 MHz is set as an example of the bandwidth. In order to divide a signal in a frequency domain, it is necessary that the frequency resolution F2/P of the P-point FFT 62 and the P-point IFFT 66 be sufficiently smaller than W and sample points of a predetermined number or greater be included in the bandwidth W. For example, assuming that an input signal is decomposed into about ten sub-spectra, if each spectrum is expressed by four samples at the minimum, it is necessary that about forty samples be present in the band of the bandwidth W. Thus, a necessary frequency resolution is F2/P≤2000/40=50 Hz. Here, since F2>50 MHz, it is necessary that P>1000000. Further, if the number of the divided sub-spectra is increased, or if the bandwidth F2 where the sub-spectra can be arranged is enlarged, P is further large. However, the FFT and IFFT in which the number of points is large as above make the circuit size extremely large, which makes it difficult to perform mounting.

A proposition of the present invention is to provide a communication system, a transmitter and a receiver capable of suppressing increase in a circuit size and providing fine frequency resolution by properly using two sampling speeds.

Means for Solving the Problems

According to an aspect of the present invention, there is provided a communication system including a transmitter which includes a spectrum dividing section that is operated at a first sampling speed F1, converts L transmission signal that are standardized at the first sampling speed F1 to L frequency domain signal and then divides the converted signals into a plurality of sub-spectra, distributes the respective sub-spectra at a desired frequency position within a processing bandwidth corresponding to the first sampling speed F1, combining the sub-spectra being distributed into a plurality of intermediate composite signals, and re-converts the respective intermediate composite signals to a plurality of L intermediate composite signals in a time domain, and a multiplexing section that extracts M (M<L) sample points for each of the intermediate composite signals and then converts the extracted sample points to M intermediate composite signals in a frequency domain at the first sampling speed F1, combines the respective intermediate composite signals at a second sampling speed F2 faster than the first sampling speed F1 (F2>F1) to generate N (N>M) frequency domain signals, and re-converts the generated signals to N time domain signals; and a receiver which includes a demultiplexing section that converts N reception signal that are standardized at the second sampling speed F2 to N frequency domain signal, extracts the frequency domain signal in a unit of M (M<N) frequency domain signals, and re-converts the respective extracted frequency domain signals to M time domain signals at the first sampling speed F1 to generate a plurality of intermediate composite signals, and a spectrum combining section that extracts L (L>M) sample points for each of the intermediate composite signals and then converts the extracted sample points to L frequency domain signals at the first sampling speed F1, extracting a plurality of sub-spectra, and re-converts combined signals to L time domain signals.

According to an aspect of the present invention, there is provided a transmitter including a spectrum dividing section that is operated at a first sampling speed F1, converts L transmission signal that are standardized at the first sampling speed F1 to L frequency domain signal and then divides the converted signals into a plurality of sub-spectra, distributes the respective sub-spectra at a desired frequency position within a processing bandwidth corresponding to the first sampling speed F1, combining the sub-spectra being distributed into a plurality of intermediate composite signals, and re-converts the respective intermediate composite signals to a plurality of L intermediate composite signals in a time domain; and a multiplexing section that extracts M (M<L) sample points for each of the intermediate composite signals and then converts the extracted sample points to M intermediate composite signals in a frequency domain at the first sampling speed F1, combines the respective intermediate composite signals at a second sampling speed F2 faster than the first sampling speed F1 (F2>F1) to generate N (N>M) frequency domain signals, and re-converts the generated signals to N time domain signals.

According to an aspect of the present invention, there is provided a receiver including a demultiplexing section that converts N reception signal that are standardized at a second sampling speed F2 to N frequency domain signal, extracts the frequency domain signal in a unit of M (M<N) frequency domain signals, and re-converts the respective extracted frequency domain signals to M time domain signals at a first sampling speed F1 to generate a plurality of intermediate composite signals; and a spectrum combining section that extracts L (L>M) sample points for each of the intermediate composite signals and then converts the extracted sample points to L frequency domain signals at the first sampling speed F1, extracting a plurality of sub-spectra, and re-converts combined signals to L time domain signals.

Effects

In the communication system according to the present invention, the transmission signal is divided into the plurality of sub-spectra at the low first sampling speed F1, the sub-spectra are combined for a predetermined band to generate the intermediate composite signals, and the intermediate composite signals are multiplexed at the high second sampling speed F2 (F2>F1) and are distributed to the broadband. In this way, as the division of the sub-spectra and the generation of the intermediate composite signals are performed at the low sampling speed and the distribution of the intermediate composite signals to the broadband is performed at the high sampling speed, it is possible to achieve desired frequency resolution without increase in a circuit size.

Here, the transmitter performs the time-frequency conversion for the intermediate composite signals combined for each band by extracting the L time signals in the M (M<L) time windows. The receiver performs the time-frequency conversion by extracting the M time signals in the unit of L points by the process reverse to the transmission side. Accordingly, it is possible to adjust two sampling speeds. Further, by operating a part of the processing section that is operated at the low speed by a time division process using a difference of the sampling speeds, it is possible to reduce the circuit size.

BRIEF DESCRIPTION OF THE DRAWINGS

FIG. 2 is a diagram illustrating signal waveforms of respective sections of a transmitter of the communication system according to Embodiment 1 of the present invention.

FIG. 3 is a diagram illustrating signal waveforms of respective sections of a receiver of the communication system according to Embodiment 1 of the present invention.

FIG. 7 is a diagram illustrating signal waveforms of respective sections of a transmitter of the communication system in the related art.

FIG. 8 is a diagram illustrating signal waveforms of respective sections of a receiver of the communication system in the related art.

DETAILED DESCRIPTION OF THE EMBODIMENTS

Embodiment 1

Figure 1:
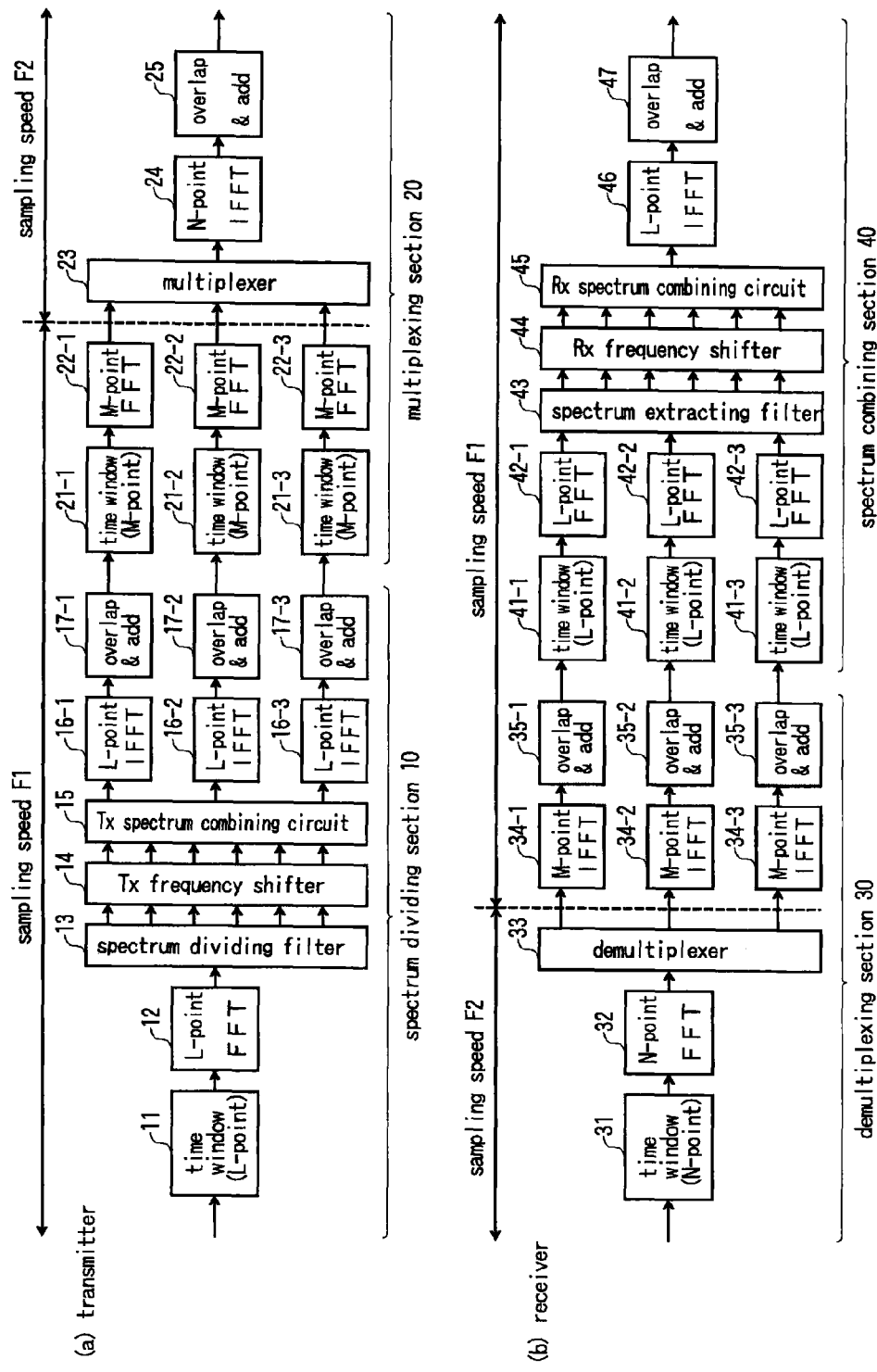
FIG. 1 is a diagram illustrating a configuration example of a communication system according to Embodiment 1 of the present invention.

FIG. 1 is a diagram illustrating a configuration example of a communication system according to Embodiment 1 of the present invention. FIG. 1(a) shows a configuration of a transmitter in the communication system, and signal waveforms of respective sections of the transmitter are shown in FIG. 2. FIG. 1(b) shows a configuration of a receiver in the communication system, and signal waveforms of respective sections of the receiver are shown in FIG. 3.

In FIG. 1(a), the transmitter of the communication system includes a spectrum dividing section 10 and a multiplexing section 20. A narrowband transmission signal is divided into plural sub-spectra by the spectrum dividing section 10 that is operated at a relatively low sampling speed F1 close to a bandwidth W, and then, one or more intermediate composite signals are combined from the divided sub-spectra. The obtained intermediate composite signals are distributed to a broadband by the multiplexing section 20 that is operated at a high sampling speed F2 (F2>F1).

The transmission signal is input to a time window processing section 11 of the spectrum dividing section 10, is extracted in a time window of an L-point length, is converted to a frequency domain by a fast Fourier transform (FFT) section of an L-point length (L-point FFT) 12, and is input to a spectrum dividing filter 13 (FIG. 2(a)). Then, the signal is divided into plural sub-spectra by the spectrum dividing filter 13 (S1 to S6 in FIG. 2(b)). The divided sub-spectra are respectively frequency-converted to predetermined frequencies by a Tx frequency shifter 14 (FIG. 2(c)), and one or more (here, three) intermediate composite signals are combined by a Tx spectrum combining circuit 15 (B1 to B3 in FIG. 2(d)). Here, the Tx spectrum combining circuit 15 selects a combination of adjacent sub-spectra included in a bandwidth F1 with reference to a frequency arrangement of sub-spectra to be finally transmitted to generate the intermediate composite signals. As understood from FIG. 2(d), since the sampling speed of each output of the Tx spectrum combining circuit 15 is F1, the bandwidth of each intermediate composite signal is also F1 at the maximum.

The intermediate composite signals are re-converted to a time domain by inverse fast Fourier transform sections of an L-point length (L-point IFFTs) 16-1 to 16-3, and are re-assembled as a continuous signal through overlap and add circuits 17-1 to 17-3.

The re-assembled intermediate composite signals are input to the multiplexing section 20 that converts (up sampling) the sampling speed from F1 to F2, and are frequency-converted to be arranged as in FIG. 2(e), to thereby obtain a final transmission spectrum.

Figure 4:
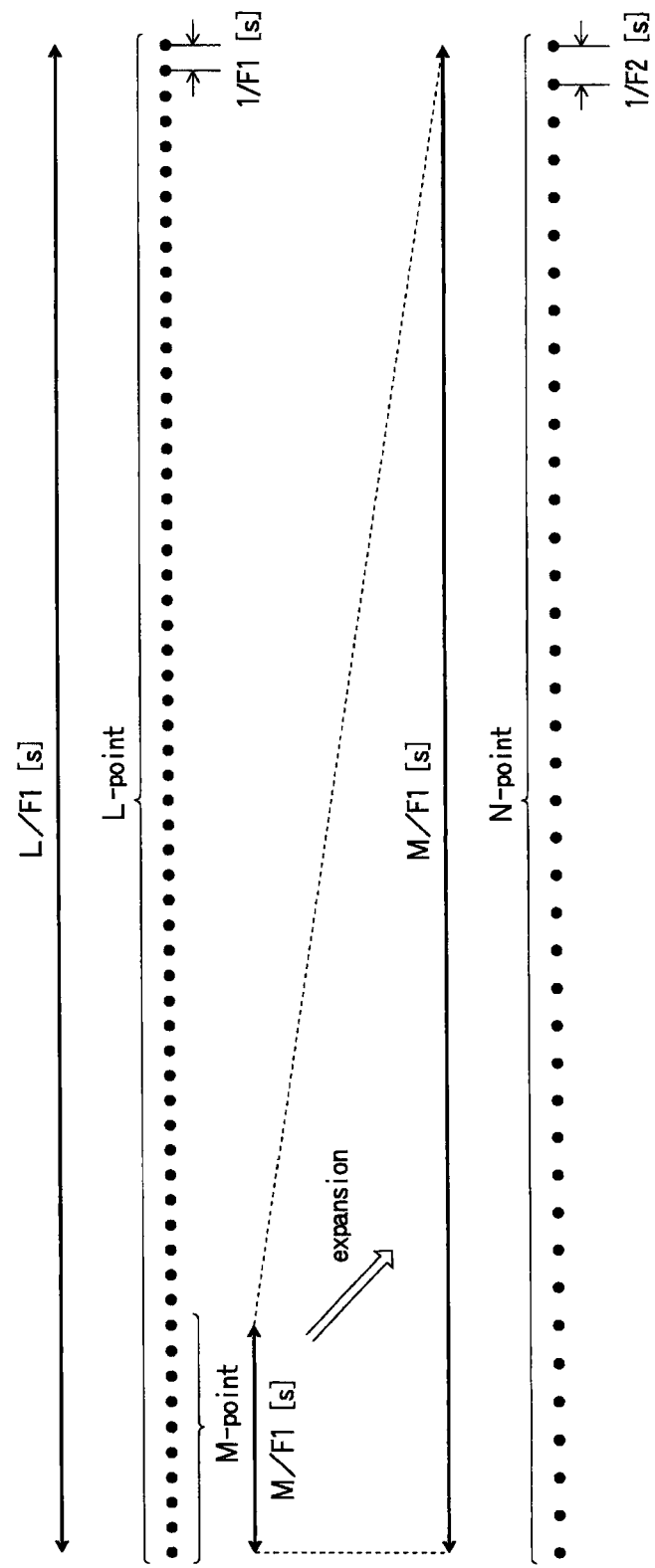
FIG. 4 is a diagram illustrating sample points on the time axis according to Embodiment 1 of the present invention.

The respective intermediate composite signals input to the multiplexing section 20 are extracted in a time window of an M-point length (M<L) by time window processing units 21-1 to 21-3, and are converted to a frequency domain by fast Fourier transform sections of an M-point length (M-point FFTs) 22-1 to 22-3. Since the sampling speed is F1 and M is smaller than L, the intermediate composite signals output in the time domain from the L-point IFFTs 16-1 to 16-3 are input to the M-point FFTs 22-1 to 22-3 as M sampling points arranged in the order of earliest time, among L sampling points, as shown in the upper side in FIG. 4.

Here, since the lengths of the M-point FFTs 22-1 to 22-3 and the L-point IFFTs 16-1 to 16-3 are different from each other but sampling speeds thereof are the same, each output in the frequency domain obtained from the M-point FFTs also has the bandwidth F1. That is, the frequency resolution in the output of the M-point FFT is F1/M. In order to up-sample the outputs at the sampling speed F2, a multiplexer 23 frequency-arranges the intermediate composite signals B1 to B3 within the bandwidth F2 as shown in FIG. 2(e) to be input to an N-point IFFT 24. Here, N=F2/(F1/M)=M×F2/F1. "0" is inserted into a domain where the intermediate composite signals are not arranged. The outputs re-converted in the time domain by the N-point IFFT 24 are re-assembled as a continuous signal through an overlap and add circuit 25. An output of the N-point IFFT 24 in the time domain (lower side in FIG. 4) is a signal obtained by up-sampling the inputs of the M-point FFTs 22-1 to 22-3 that are at the low sampling speed (F1) to F2.

In FIG. 1(b), the receiver of the communication system includes a demultiplexing section 30 and a spectrum combining section 40. One or more intermediate composite signals are extracted from a broadband reception signal by the demultiplexing section 30 that is operated at the high sampling speed F2, and the obtained intermediate composite signals are re-combined to a transmission signal by the spectrum combining section 40 that is operated at the low sampling speed F1.

The reception signal is extracted in a time window of an N-point length by a time window processing section 31 of the demultiplexing section 30, is converted to a frequency domain by an N-point FFT 32, and is input to a demultiplexer 33 (FIG. 3(a)). The demultiplexer 33 selects and extracts a combination (B1 to B3 in FIG. 3(a)) of adjacent sub-spectra included in the bandwidth F1 in a contrary manner to the multiplexer 23 of the transmitter to be extracted to generate intermediate separation signals (FIG. 3(b)). The intermediate separation signals are respectively low-speed signals of the bandwidth F1, which are re-converted to a time domain by M-point IFFTs 34-1 to 34-3, and are re-assembled as a continuous signal through overlap and add circuits 35-1 to 35-3.

Since the low-speed intermediate separation signals are obtained by the demultiplexing section 30, the spectrum combining section 40 that extracts and combines sub-spectra from the obtained low-speed intermediate separation signals may be operated at the low sampling speed F1. Each intermediate separation signal is extracted in a time window of an L-point length by time window processing sections 41-1 to 41-3, and is converted to a frequency domain by L-point FFTs 42-1 to 42-3. Then, the respective sub-spectra are extracted by a spectrum extracting filter 43 (FIG. 3(c)), and are frequency-converted by a Rx frequency shifter 44 so that each sub-spectrum has the same frequency relation as the frequency relation immediately after the spectrum dividing filter of the transmitter (FIG. 3(d)). These sub-spectra are re-combined as one signal by a Rx spectrum combining circuit 45, are finally re-converted to a time domain by an L-point IFFT 46, and then are re-assembled as a continuous signal through an overlap and add circuit 47.

For simplicity, in FIG. 1, a configuration diagram of another branch having the same configuration, necessary to an overlap and add process is not shown.

In the same condition (W=2 KHz, F2>50 MHz) as in the case described in the related art, a length necessary for FFT/IFFT in the configuration in FIG. 1 is calculated as follows. If a frequency resolution necessary for dividing an input signal into ten is set to 50 Hz similarly to the related art, L=4096 and M=16, F1=204.8 kHz. Here, if N=4096, F2=52.4288 MHz, which satisfies the condition. Considering that the sizes of FFT and IFFT of a K-point length are proportional to K $\log_2 K$, compared with the related art configuration in which FFT and IFFT of a length of 1000000 points are necessary, the configuration of the present invention is overwhelmingly small in size.

Embodiment 2

Figure 5:
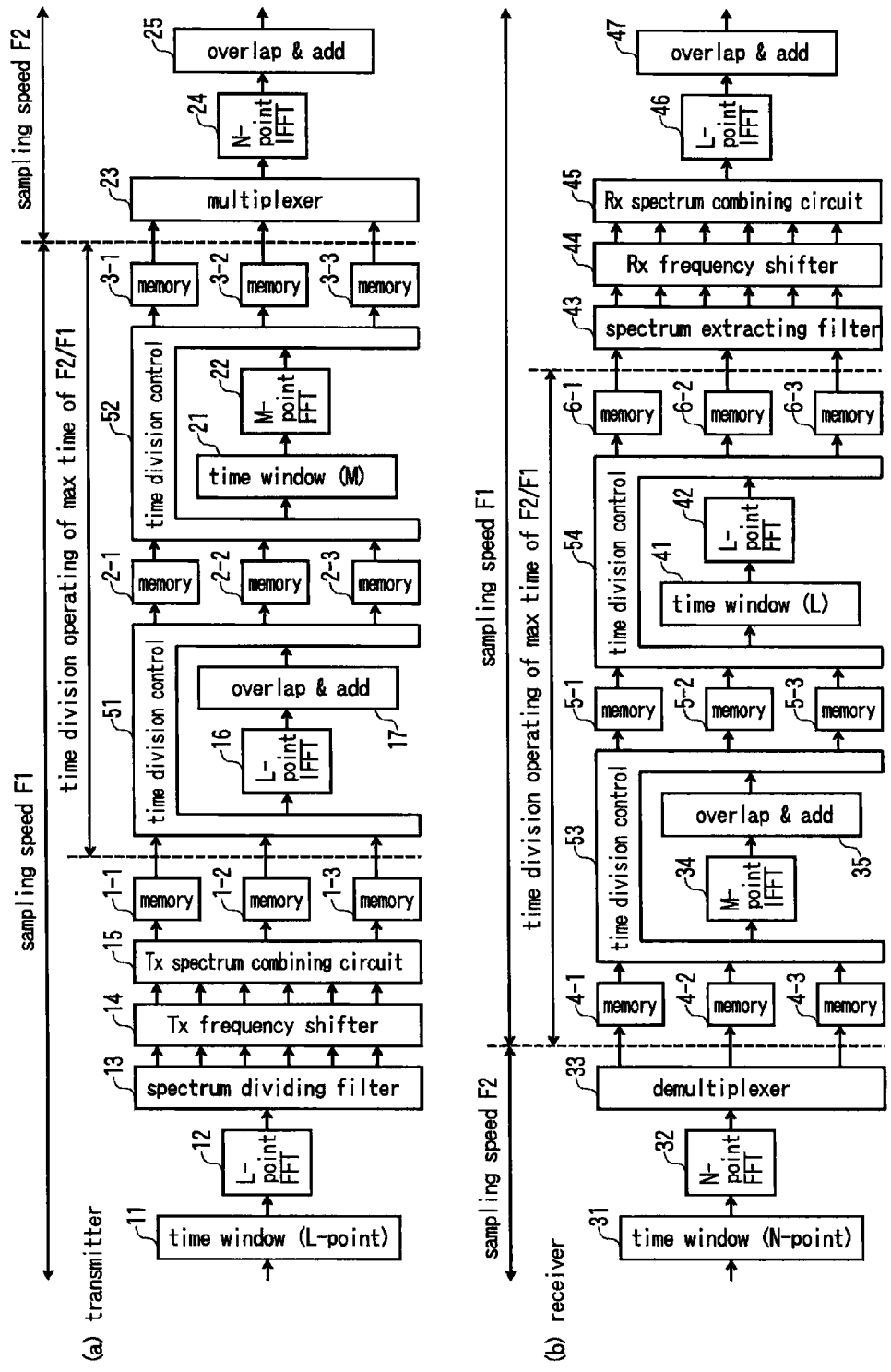
FIG. 5 is a diagram illustrating a configuration example of a communication system according to Embodiment 2 of the present invention.
Figure 6:
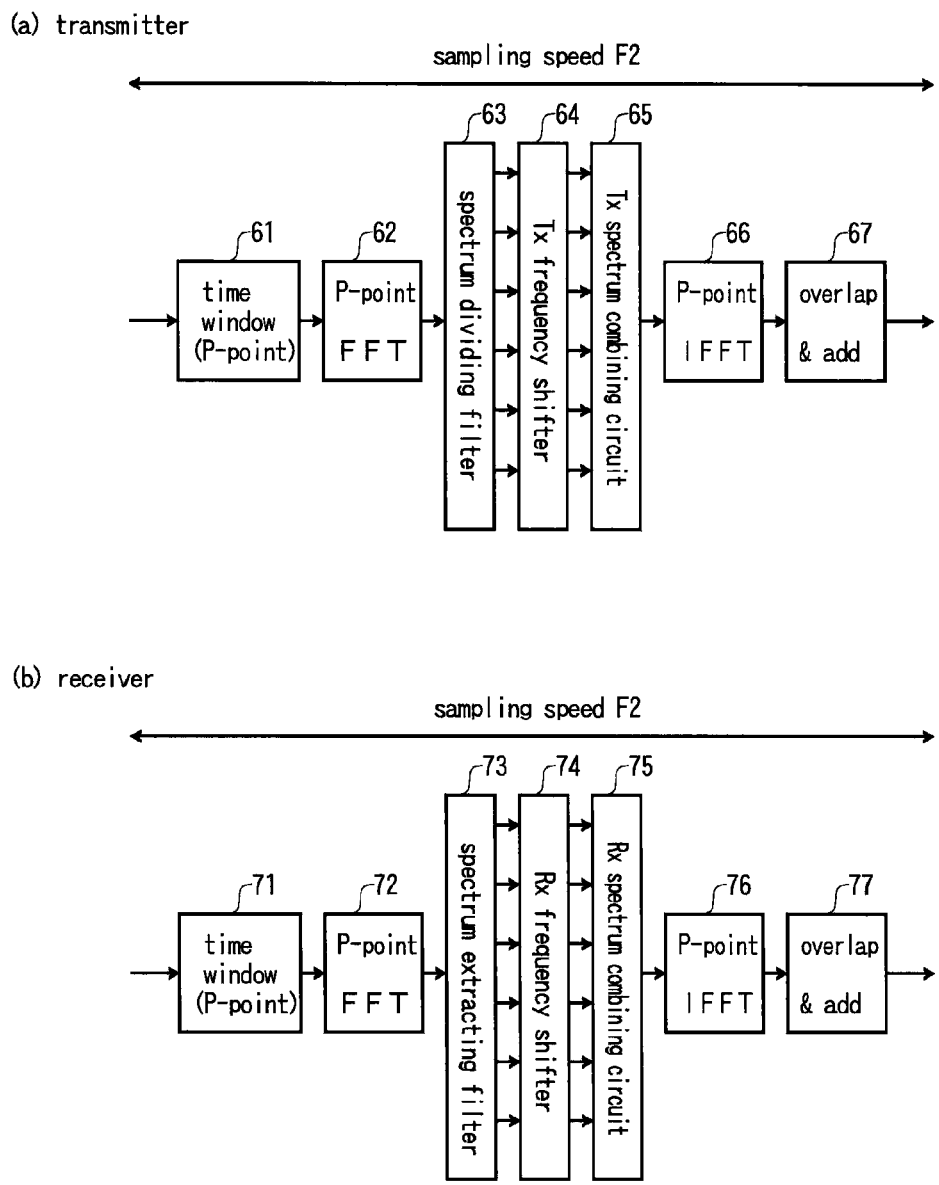
FIG. 6 is a diagram illustrating a configuration example of a communication system that performs the direct spectrum division transmission in the related art.

FIG. 5 illustrates a configuration example of a communication system according to Embodiment 2 of the present invention. FIG. 5(a) shows a configuration of a transmitter in the communication system, and FIG. 5(b) shows a configuration of a receiver in the communication system.

The configuration of the present embodiment is a configuration in which sections where plural signals are processed in parallel in the configuration in FIG. 1, that is, the processes from the L-point IFFT 16 to the M-point FFT 22 in the transmitter and the processes from the M-point IFFT 34 to the L-point FFT 42 in the receiver are multiplexed by a time division process to be realized by a one-branch processing circuit.

In the transmitter of FIG. 5(a), memories 1-1 to 1-3 and a time division control section 51 are coupled to each other between the Tx spectrum combining circuit 15 and the one-branch L-point IFFT 16; the time division control section 51, memories 2-1 to 2-3 and a time division control section 52 are coupled to each other between the overlap and add circuit 17 and the time window processing section 21; and the time division control section 52 and memories 3-1 to 3-3 are coupled to each other between the M-point FFT 22 and the multiplexer 23.

In the receiver of FIG. 5(b), memories 4-1 to 4-3 and a time division control section 53 are coupled to each other between the demultiplexer 33 and the one-branch M-point IFFT 34; the time division control section 53, memories 5-1 to 5-3 and a time division control section 54 are coupled to each other between the overlap and add circuit 35 and the time window processing section 41; and the time division control section 54 and memories 6-1 to 6-3 are coupled to each other between the L-point FFT 42 and the spectrum extracting filter 43.

Any section where the parallel processes are performed is operated at the low sampling speed F1. If these processes are time-division-operated at the high sampling speed F2, it is possible to perform processes of times of F2/F1 at the maximum during a sampling period (1/F1). In the present embodiment, it is possible to reduce plural necessary processing circuits to a single branch using the above-described configuration.

In the above description, the configuration in which the multiplexing section 20 of the transmitter and the demultiplexing section 30 of the receiver employ signal processing in the frequency domain based on FFT/IFFT, but a different configuration may be used. That is, since the multiplexing section 20 of the transmitter has the functions of the up sampling of the intermediate composite signals and the frequency conversion, and the demultiplexing section 30 of the receiver has the functions of the extraction of the intermediate separation signals and the down sampling, for example, a configuration may be used in which a combination of a filter bank, an interpolator and a decimator disclosed in Japanese Unexamined Patent Application Publication No. 2007-312200 "Digital Signal Demultiplexing Device and Multiplexing Device" are employed.

Further, the present apparatus is applicable to input a signal other than a single carrier, such as a multicarrier signal or an analogue signal, as an input signal and division-transmit the input signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A communication system comprising:
a transmitter including:
a spectrum dividing section being operated at a first sampling speed F1, converting L transmission signal that are standardized at the first sampling speed F1 to L frequency domain signal and then dividing the signals being converted into a plurality of sub-spectra, distributing the respective sub-spectra at a desired frequency position within a processing bandwidth corresponding to the first sampling speed F1, combining the sub-spectra being distributed into a plurality of intermediate composite signals, and re-converting the respective intermediate composite signals to a plurality of L intermediate composite signals in a time domain; and
a multiplexing section extracting M (M<L) sample points for each of the intermediate composite signals and then converts the sample points being extracted to M intermediate composite signals in a frequency domain at the first sampling speed F1, combining the respective intermediate composite signals at a second sampling speed F2 faster than the first sampling speed F1 (F2>F1) to generate N (N>M) frequency domain signals, and re-converting the signals being generated to N time domain signals; and
a receiver including:
a demultiplexing section converting N reception signal that are standardized at the second sampling speed F2 to N frequency domain signal, extracting the frequency domain signal in a unit of M (M<N) frequency domain signals, and re-converting the respective frequency domain signals being extracted to M time domain signals at the first sampling speed F1 to generate a plurality of intermediate composite signals; and
a spectrum combining section extracting L (L>M) sample points for each of the intermediate composite signals and then converting the sample points being extracted to L frequency domain signals at the first sampling speed F1, extracting a plurality of sub-spectra, and re-converting combined signals to L time domain signals.

2. A transmitter comprising:
a spectrum dividing section being operated at a first sampling speed F1, converting L transmission signal that are standardized at the first sampling speed F1 to L frequency domain signal and then dividing the signals being converted into a plurality of sub-spectra, distributing the respective sub-spectra at a desired frequency position within a processing bandwidth corresponding to the first sampling speed F1, combining the sub-spectra being distributed into a plurality of intermediate composite signals, and re-converting the respective intermediate composite signals to a plurality of L intermediate composite signals in a time domain; and
a multiplexing section extracting M (M<L) sample points for each of the intermediate composite signals and then converting the sample points being extracted to M intermediate composite signals in a frequency domain at the first sampling speed F1, combining the respective intermediate composite signals at a second sampling speed F2 faster than the first sampling speed F1 (F2>F1) to generate N (N>M) frequency domain signals, and re-converting the signals being generated to N time domain signals.

3. A receiver comprising:
a demultiplexing section converting N reception signal that are standardized at a second sampling speed F2 to N frequency domain signal, extracting the frequency domain signal in a unit of M (M<N) frequency domain signals, and re-converting the respective frequency domain signals being extracted to M time domain signals at a first sampling speed F1 to generate a plurality of intermediate composite signals; and
a spectrum combining section extracting L (L>M) sample points for each of the intermediate composite signals and then converting the sample points being extracted to L frequency domain signals at the first sampling speed F1, extracting a plurality of sub-spectra, and re-converting combined signals to L time domain signals.

* * * * *